(12) United States Patent
Sekiguchi et al.

(10) Patent No.: US 10,478,966 B2
(45) Date of Patent: Nov. 19, 2019

(54) WORKPIECE SUPPORT SYSTEM

(71) Applicant: TOYOTA JIDOSHA KABUSHIKI KAISHA, Toyota-shi, Aichi-ken (JP)

(72) Inventors: Tomohiko Sekiguchi, Nagakute (JP); Masataka Mizuno, Toyota (JP); Kazuyuki Ogusu, Okazaki (JP); Kenichi Asakuma, Nagoya (JP); Kimihiro Nanaeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/364,967

(22) Filed: Nov. 30, 2016

(65) Prior Publication Data

US 2017/0157765 A1    Jun. 8, 2017

(30) Foreign Application Priority Data

Dec. 3, 2015  (JP) ................................. 2015-236645

(51) Int. Cl.
*B25J 9/00*    (2006.01)
*B62D 65/02*    (2006.01)

(52) U.S. Cl.
CPC ......... *B25J 9/0096* (2013.01); *B23P 2700/50* (2013.01); *B62D 65/026* (2013.01)

(58) Field of Classification Search
CPC ... B62D 65/026; B25J 9/0096; B25J 15/0052; B25J 15/0061

USPC ........................................................... 29/429
See application file for complete search history.

(56) References Cited

U.S. PATENT DOCUMENTS

| 8,496,425 B2 * | 7/2013 | Lin ...................... B25J 15/0061 192/223 |
| 2006/0245901 A1 | 11/2006 | Yamaoka et al. |
| 2008/0000068 A1 * | 1/2008 | Savoy ................... B23P 21/004 29/429 |

FOREIGN PATENT DOCUMENTS

| CN | 1761599 A | 4/2006 |
| JP | H01-234189 A | 9/1989 |
| JP | H04-334678 A | 11/1992 |
| JP | H05-02887 U | 1/1993 |
| JP | 2006-095576 A | 4/2006 |
| JP | 2007-245300 | * 9/2007 ............... B25J 9/10 |
| JP | 2014-129033 A | 7/2014 |

* cited by examiner

*Primary Examiner* — Ronald P Jarrett
(74) *Attorney, Agent, or Firm* — Oliff PLC

(57) ABSTRACT

A workpiece support system includes: a workpiece support device that supports a workpiece by a support body having a support that comes in contact with the workpiece; and a robot that is separately provided outside the workpiece support device and moves the support, wherein the support is configured to be movable within a predetermined range and lockable at an arbitrary position, and wherein, by grasping a part of the locked support body, the robot unlocks the support and moves the unlocked support according to the shape of the workpiece.

14 Claims, 10 Drawing Sheets

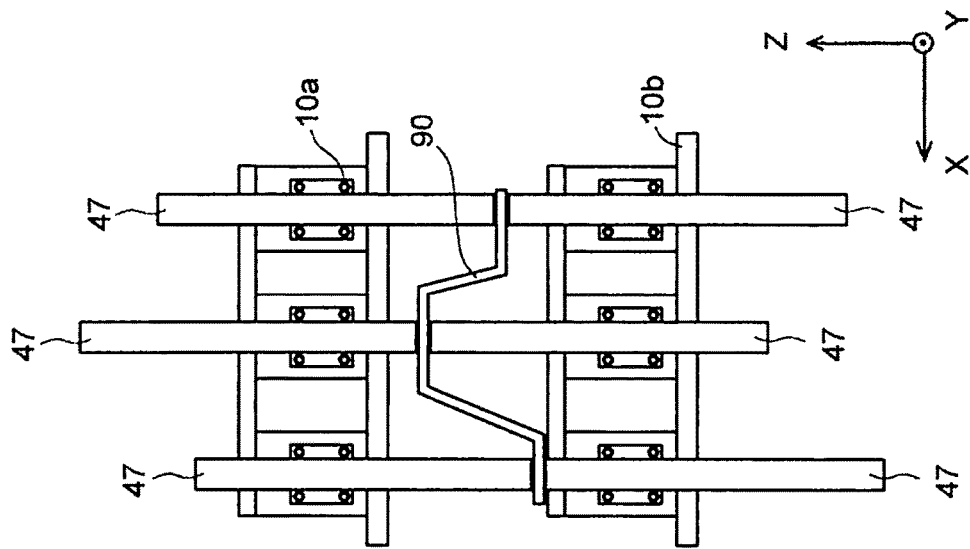
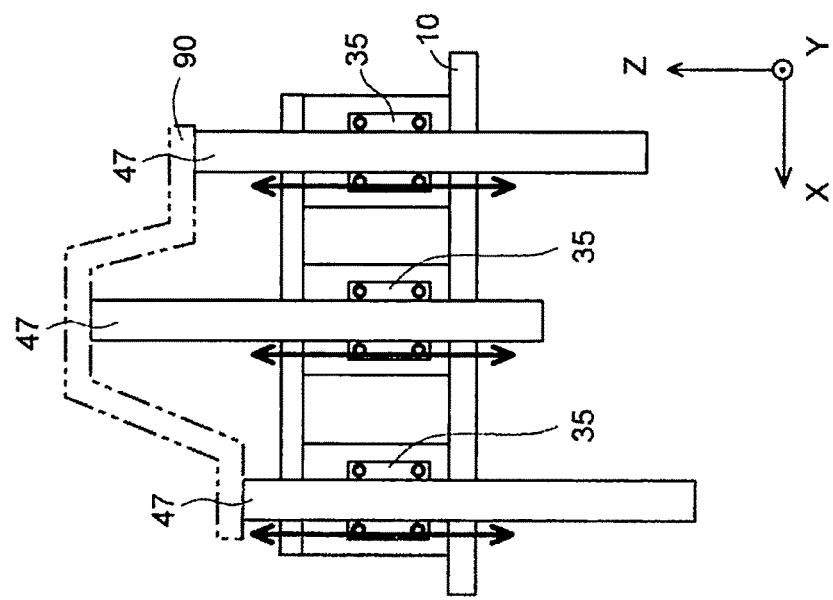

WORKPIECE SUPPORT SYSTEM

INCORPORATION BY REFERENCE

The disclosure of Japanese Patent Application No. 2015-236645 filed on Dec. 3, 2015 including the specification, drawings and abstract is incorporated herein by reference in its entirety.

BACKGROUND

1. Technical Field

The technical field relates to a workpiece support system, specifically a workpiece support system that supports a workpiece, for example, during welding etc. of a vehicle.

2. Description of Related Art

Workpiece support devices that support workpieces, for example, during welding etc. of vehicles are often produced specially for each type of workpieces, i.e., each type of vehicles. In such a specialized workpiece support device, the position of a support that supports a workpiece is fixed. However, if a movable support is adopted, a plurality of types of workpieces can be supported by one workpiece support device. Japanese Patent Application Publication No. 2014-129033 discloses a workpiece support device (assembling device) that supports a workpiece by supports that are movable in X-, Y-, and Z-axis directions.

The workpiece support device disclosed in JP 2014-129033 A has a complicated structure and is difficult to transfer between manufacturing steps, for example, because of a driving source (cylinder) for each support being mounted thereon.

SUMMARY

Having been devised to solve the above problem, the disclosure aims to provide a workpiece support system that can simplify the structure of the workpiece support device and facilitate the transfer of the workpiece support device between manufacturing steps, for example.

A workpiece support system according to one aspect of the disclosure includes: a workpiece support device that supports a workpiece by a support body having a support that comes in contact with the workpiece; and a robot that is separately provided outside the workpiece support device and moves the support, wherein the support is configured to be movable within a predetermined range and lockable at an arbitrarily position, and wherein, by grasping a part of the locked support body, the robot unlocks the support and moves the unlocked support according to the shape of the workpiece. Thus, in the workpiece support system according to one aspect of the disclosure, the robot that is separately provided outside the workpiece support device unlocks and moves the lockable support. Accordingly, it is not necessary to mount a driving source for moving the support on the workpiece support device, so that the structure of the workpiece support device can be simplified and the transfer of the workpiece support device between manufacturing steps, for example, can be facilitated.

The support body may have a robot-clamped unit that unlocks the support by being supplied with air, and the robot may have a tool unit that supplies the air. As the tool unit of the robot grasps the robot-clamped unit of the support body, the air may be supplied from the tool unit to the robot-clamped unit and the support may be unlocked. With this configuration, the support is not unlocked unless the tool unit grasps the robot-clamped unit, so that the position of the support can be maintained and a workpiece set on the support can be prevented from falling.

The robot may move the support with the tool unit thereof grasping the robot-clamped unit. With this configuration, displacement of the support can be restrained.

According to the aspect of the disclosure, it is possible to provide a workpiece support system that can simplify the structure of the workpiece support device and facilitate the transfer of the workpiece support device between manufacturing steps, for example.

BRIEF DESCRIPTION OF THE DRAWINGS

Features, advantages, and technical and industrial significance of exemplary embodiments will be described below with reference to the accompanying drawings, in which like numerals denote like elements, and wherein:

FIGS. 5A and 5B are views illustrating a robot-clamped unit and a tool unit in the workpiece support system according to Embodiment 1, of which FIG. 5A shows a state before the tool unit grasps the robot-clamped unit, and FIG. 5B shows a state where the tool unit has grasped the robot-clamped unit;

FIG. 9A is a view illustrating a workpiece support device in a workpiece support system according to Embodiment 4;

FIG. 9B is a view illustrating the workpiece support device in the workpiece support system according to Embodiment 4.

DETAILED DESCRIPTION OF EMBODIMENTS

Best modes for carrying out the disclosure will be described below with reference to the accompanying drawings. However, the disclosure is not limited to the following embodiments. The following description and the drawings are simplified as appropriate to clarify the illustration.

Embodiment 1

Figure 1:
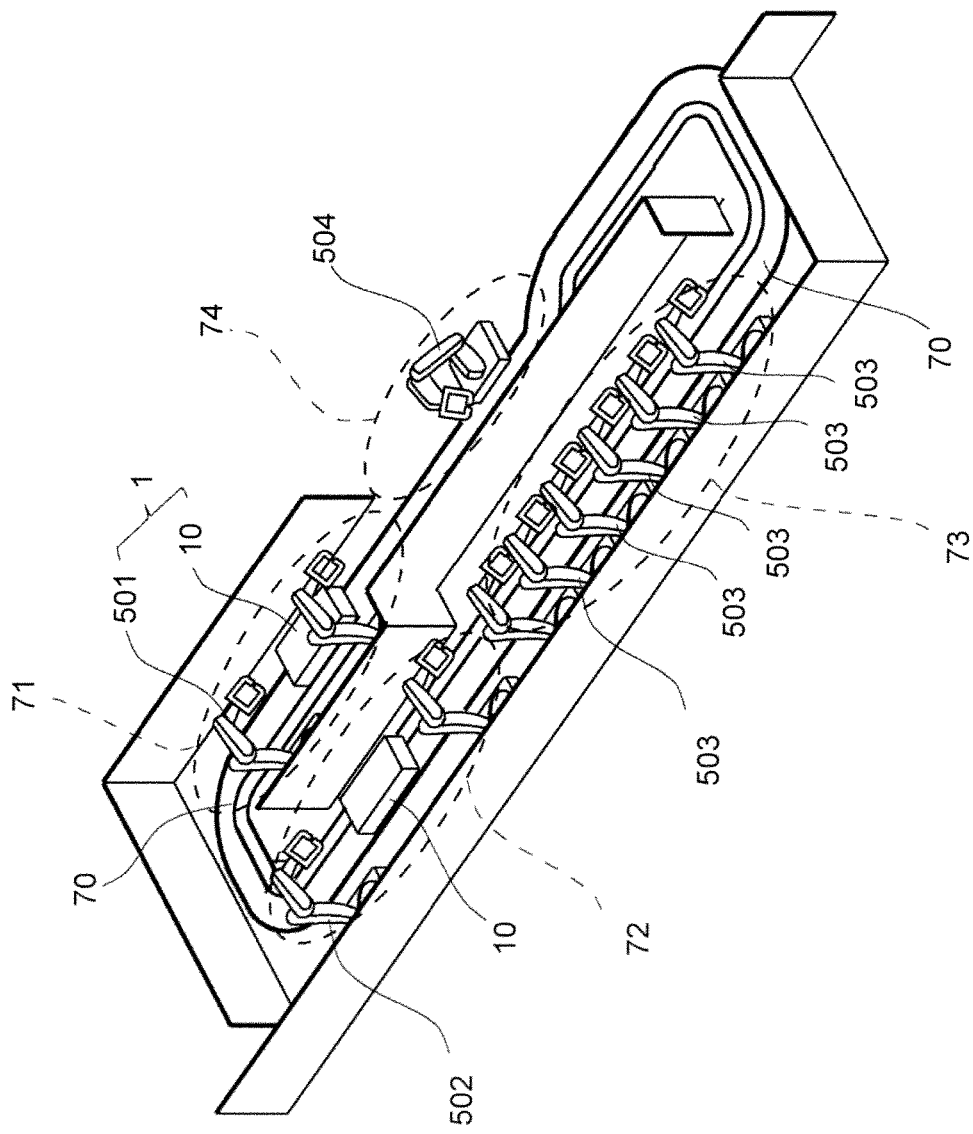
FIG. 1 is a perspective view of a vehicle welding assembly line employing a workpiece support system according to Embodiment 1.

A workpiece support system according to Embodiment 1 will be described. First, the configuration of the workpiece support system will be described. FIG. 1 is a perspective view of a vehicle welding assembly line employing the workpiece support system according to Embodiment 1. As shown in FIG. 1, in a vehicle welding assembly line 70, a self-propelled transfer machine circles along the line 70 with a workpiece support device 10 mounted thereon. A predetermined step is allocated to each predetermined position in the line 70. The self-propelled transfer machine with the workpiece support device 10 mounted thereon goes through a loop of a series of steps, from a vehicle type switching step 71 through a workpiece setting step 72, a welding/deposition assembly step 73, and a finished product removal step 74 to the vehicle type switching step 71 for the next vehicle type. In these steps, predetermined operations are respectively performed by specialized robots 501, 502, 503, 504. The workpiece support system 1 according to Embodiment 1 is provided for the vehicle type switching step 71, and has the workpiece support device 10 and the robot 501 for switching vehicle types.

Figure 2:
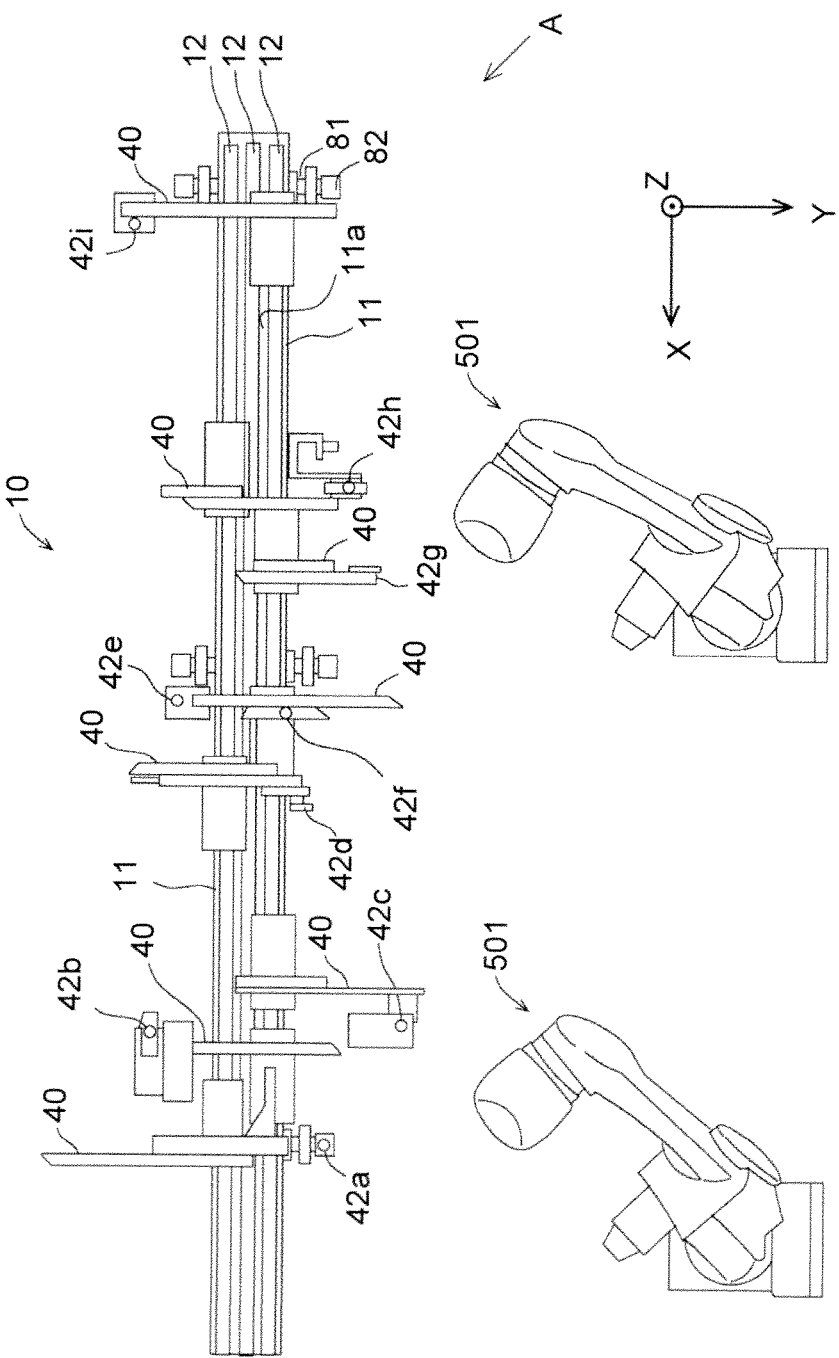
FIG. 2 is a top view illustrating the workpiece support system of FIG. 1.
Figure 3:
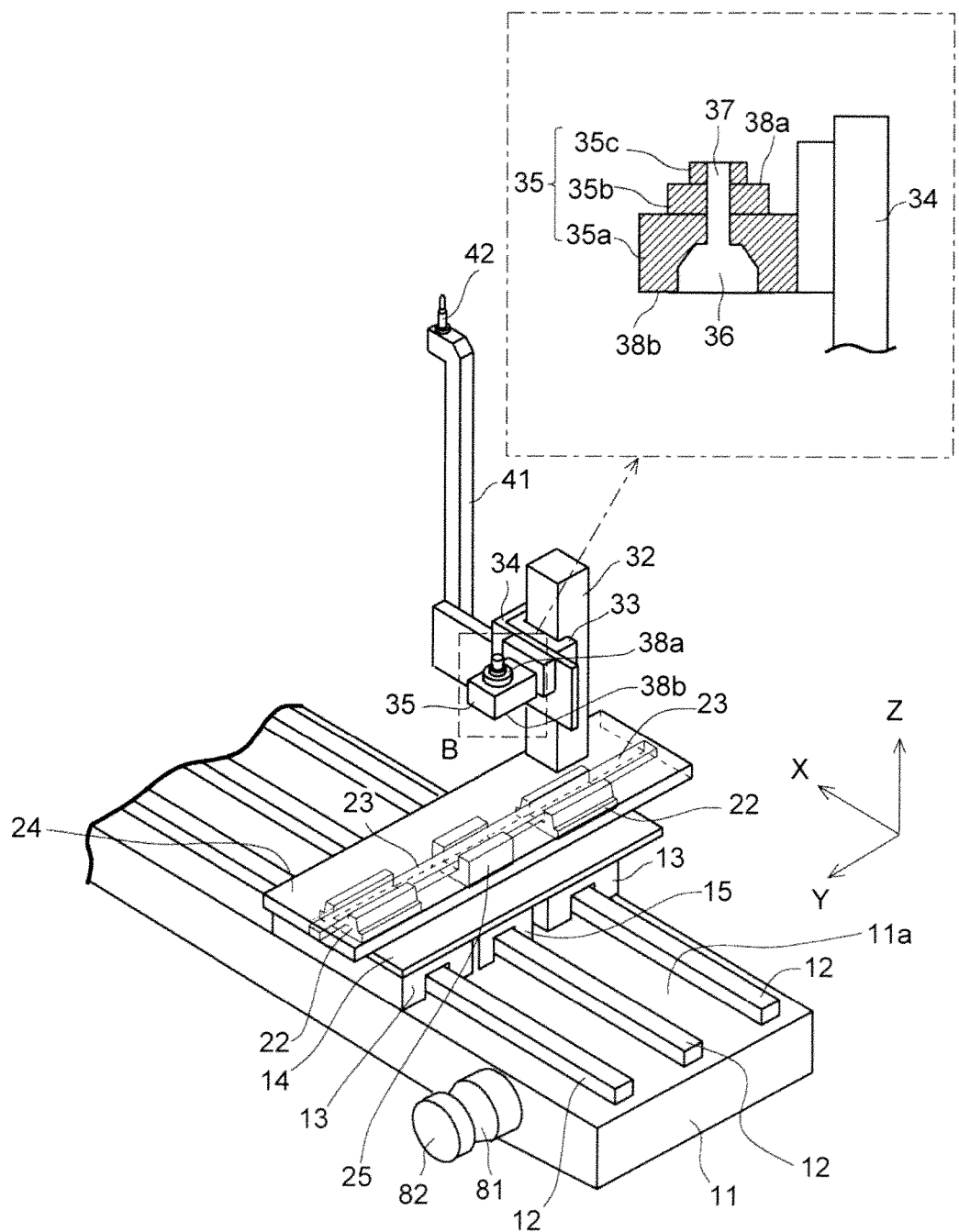
FIG. 3 is a perspective view illustrating a support body in the workpiece support system according to Embodiment 1.

Next, the configuration of the workpiece support device 10 in the workpiece support system 1 provided for the vehicle type switching step 71 shown in FIG. 1 will be described. FIG. 2 is a top view illustrating the workpiece support system of FIG. 1. FIG. 3 is a perspective view illustrating a support body in the workpiece support system according to Embodiment 1. FIG. 3 is a perspective view as seen along the arrow A in FIG. 2. In FIG. 3, an enlarged view of the part B is also shown.

As shown in FIG. 2 and FIG. 3, the workpiece support device 10 has a plate-like base 11 with a thin long shape. In FIG. 2 and FIG. 3, for convenience of illustration, a right-handed Cartesian XYZ-coordinate system is introduced. The Z-axis direction is the vertical direction, which is perpendicular to an upper surface 11a of the base 11. The upward direction and the downward direction are the +Z-axis direction and the −Z-axis direction, respectively. The X-axis direction and the Y-axis direction are horizontal directions. The X-axis direction is the direction in which the base 11 extends. In the X-axis direction, one direction, for example, the direction in which the self-propelled transfer machine advances is the +X-axis direction. The opposite direction is the −X-axis direction. The Y-axis direction is the direction of the width of the base 11.

The workpiece support device 10 has X-guides 12, a plurality of support bodies 40, and axles 81 and wheels 82, other than the base 11.

The X-guides 12 are provided on the base 11. The X-guides 12 are rail-like members and extend in the X-axis direction. One or more X-guides 12 are provided, and in the shown example, three X-guides 12 are provided.

The plurality of support bodies 40 are provided on the base 11. Each support body 40 has X-slides 13, an X-stage 14, Y-guides 22, a Y-slide 23, a Y-stage 24, a Z-guide 32, a Z-slide 33, a Z-stage 34, a pole 41, and a support 42. Of the support bodies 40, the support body 40 located farthest in the −X-axis direction will be described. The description of the other support bodies 40 will be omitted, as the structure is the same as that of the one support body 40 except that the locked positions of the X-slides 13, the Y-slide 23, and the Z-slide 33 etc. are different.

As shown in FIG. 3, the X-slides 13 are fixed to the lower surface of the X-stage 14 and slidably attached to the X-guides 12. The X-slides 13 are rectangular parallelepiped members with a groove into which the rail-like X-guide 12 is fitted. For example, one X-slide 13 is attached to each of the two X-guides 12 on both sides of the three X-guides 12. The X-slides 13 are slidable in the X-axis direction along the X-guides 12.

The X-stage 14 is a plate-like member provided on the X-slides 13. The X-stage 14 has a horizontal portion formed in the upper surface. In a case where a plurality of X-guides 12 are provided, it is preferable that the X-stage 14 is provided so as to straddle the plurality of X-slides 13 that are arranged side by side in the Y-axis direction. The X-stage 14 is slidable in the X-axis direction along with the X-slides 13.

A lock 15 is fixed to the lower surface of the X-stage 14, side by side with the X-slides 13. The lock 15 is slidable in the X-axis direction along the center X-guide 12 and fixable to the center X-guide 12. When the lock 15 is fixed to the center X-guide 12, the position of the X-stage 14 is fixed. Conversely, when the lock 15 is released from fixation, the X-stage 14 becomes slidable in the X-axis direction.

The Y-guides 22 are fixed on the X-stage 14. The Y-guides 22 are rail-like members with a groove into which the Y-slide 23 is fitted, and extend in the Y-axis direction. One or more, for example, two Y-guides 22 are provided on the X-stage 14. The Y-guides 22 are arranged side by side in a row at an interval in the Y-axis direction. For clarity, the Y-guides 22 are shown transparently in FIG. 3.

The Y-slide 23 is a square bar member extending in the Y-axis direction, and is fixed to the lower surface of the Y-stage 24. For example, one Y-slide 23 is attached along the two Y-guides 22 that are arranged side by side in a row. The Y-slide 23 is slidable in the Y-axis direction while remaining fitted in the grooves of the Y-guides 22. For clarity, the Y-slide 23 is shown transparently in FIG. 3.

The Y-stage 24 is a plate-like member, and the upper surface thereof is horizontal, for example.

A lock 25 is fixed on the X-stage 14, between the two Y-guides 22. The Y-slide 23 is slidable over the lock 25 in the Y-axis direction and fixable to the lock 25. When the Y-slide 23 is fixed to the lock 25, the position of the Y-stage 24 is fixed. Conversely, when the Y-slide 23 is released from fixation to the lock 25, the Y-stage 24 becomes slidable in the Y-axis direction.

The Z-guide 32 is provided on the Y-stage 24. The Z-guide 32 is a square bar member extending in the Z-axis direction. In other words, the Z-guide 32 stands upright on the Y-stage 24 and extends upward. One or more Z-guides 32 are provided on the Y-stage 24, and in the example shown in FIG. 3, one Z-guide 32 is provided.

The Z-slide 33 is fixed to one principal surface of the Z-stage 34 that is a plate-like member, and is slidably attached to the Z-guide 32. For example, one Z-slide 33 is attached to the Z-guide 32. The Z-slide 33 also functions as a lock. The Z-slide 33 is slidable in the Z-axis direction along the Z-guide 32 and fixable to the Z-guide 32. When the Z-slide 33 is fixed to the Z-guide 32, the position of the Z-stage 34 is fixed. Conversely, when the Z-slide 33 is released from fixation, the Z-stage 34 becomes slidable in the Z-axis direction.

A robot-clamped unit 35 is attached to the other principal surface of the Z-stage 34. The details of the robot-clamped unit 35 will be described later.

The pole 41 is attached to the Z-stage 34. The pole 41 extends upward, i.e., in the +Z-axis direction. The support 42 is provided at the leading end of the pole 41. For example, the support 42 has the shape of a pin extending upward. Instead of having a pin shape, the support 42 may be provided with a receiving surface having a portion extending horizontally.

As shown in FIG. 3, the robot-clamped unit 35 has a pedestal portion 35a having a rectangular columnar shape, a circular column portion 35b provided on the pedestal portion 35a, and a leading end portion 35c provided on the circular column portion 35b. The robot-clamped unit 35 is attached to the Z-stage 34, with the center axis of the circular column portion 35b oriented in the Z-axis direction. The upper surface of the circular column portion 35b serves as an upper reference surface 38a, and the lower surface of the pedestal portion 35a serves as a lower reference surface 38b. The pedestal portion 35a has a pinhole 36 formed inside. The pinhole 36 leads to an air supply hole 37 formed inside the leading end portion 35c. The Z-slide 33 can be unlocked by supplying air into the air supply hole 37. In other words, the Z-slide 33 can be slid by supplying air into the air supply hole 37. When air is not supplied into the air supply hole 37, sliding of the Z-slide 33 is locked by the atmospheric pressure.

Locking of the Z-slide 33 and locking of the Y-slide 23 and the X-slides 13 by the lock 25 and the lock 15, respectively, may be interlocked with each other. In other words, when air is supplied into the air supply hole 37, not only the Z-slide 33 but also the Y-slide 23 and the X-slides 13 may be unlocked. In this case, as the robot 501 grasps the robot-clamped unit 35 and air is supplied into the air supply hole 37, the X-slides 13, the Y-slide 23, and the Z-slide 33 are unlocked, so that the support 42 can be moved to an arbitrary three-dimensional position with the robot 501 grasping the robot-clamped unit 35. Then, after moving the support 42 to an arbitrary position by the robot 501, the X-slides 13, the Y-slide 23, and the Z-slide 33 can be locked again by stopping the air supply into the air supply hole 37. Thus, the support 42 can be moved to an arbitrarily position by the robot 501 grasping the robot-clamped unit 35. Conversely, the support 42 can be retained at the position by the robot 501 releasing the robot-clamped unit 35.

The axle 81 is a round bar member and extends in the direction of the width of the base 11. A plurality of, for example, three axles 81 are attached at intervals to the base 11. Both ends of the axle 81 protrude from the base 11 in the +Y-axis direction and the −Y-axis direction. The wheels 82 are attached to the ends of the axle 81. The workpiece support device 10 can move along the line 70 by being mounted on the self-propelled transfer machine.

Figure 4:
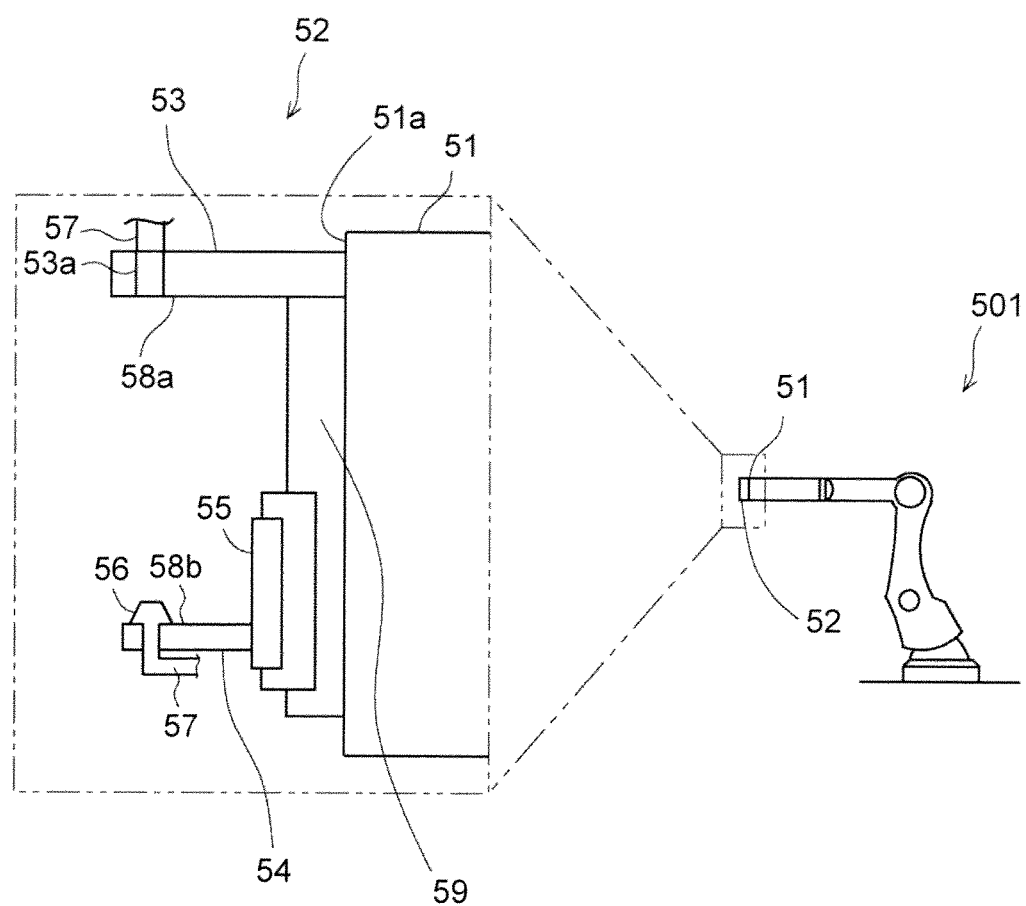
FIG. 4 is a view illustrating a robot in the workpiece support system according to Embodiment 1.

Next, the robot 501 in the workpiece support system 1 will be described. FIG. 4 is a view illustrating the robot in the workpiece support system according to Embodiment 1. As shown in FIG. 4, the robot 501 is independently and separately provided outside the workpiece support device 10. The robot 501 has a foundation. The foundation is fixed to a floor surface. The robot 501 has a structure with a plurality of rod-like arms continuously coupled to each other from the foundation. The arms are coupled through joints. Thus, the robot 501 can rotate and bend within a predetermined range.

The tool unit 52 is provided at a leading end 51 of the robot 501. The tool unit 52 has an upper finger 53, a lower finger 54, and a palm 59. The upper finger 53 and the lower finger 54 protrude in a direction perpendicular to an end face 51a of the leading end 51. The palm 59 is provided between the lower finger 54 and the end face 51a and extends to the upper finger 53. The tool unit 52 has a U-shape formed by the upper finger 53, the lower finger 54, and the palm 59.

The palm 59 is provided with an air cylinder 55. The air cylinder 55 is connected to the lower finger 54. The lower finger 54 moves toward the upper finger 53 by being driven by the air cylinder 55. The lower finger 54 also moves away from the upper finger 53 by being driven by the air cylinder 55. The driving source for the lower finger 54 is not limited to the air cylinder 55 but may instead be an NC actuator, a servomotor, or the like.

A pin 56 is formed in the vicinity of the leading end of the lower finger 54 so as to protrude toward the upper finger 53 from a receiving surface 58b that faces the upper finger 53. The receiving surface 58b of the lower finger 54 comes in contact with the lower reference surface 38b of the robot-clamped unit 35, and the pin 56 is fitted into the pinhole 36 of the robot-clamped unit 35. The pin 56 is open at the leading end. The pin 56 is connected to an air supply unit (not shown) through a pipe 57. Thus, air jets out of the opening at the leading end of the pin 56.

A receiving surface 58a facing the lower finger 54 is formed in the vicinity of the leading end of the upper finger 53. A through-hole 53a connected to the pipe 57 is formed in the vicinity of the leading end of the upper finger 53. The receiving surface 58a of the upper finger 53 comes in contact with the upper reference surface 38a of the robot-clamped unit 35, and the through-hole 53a is fitted with the leading end portion 35c of the robot-clamped unit 35.

Figure 5A:
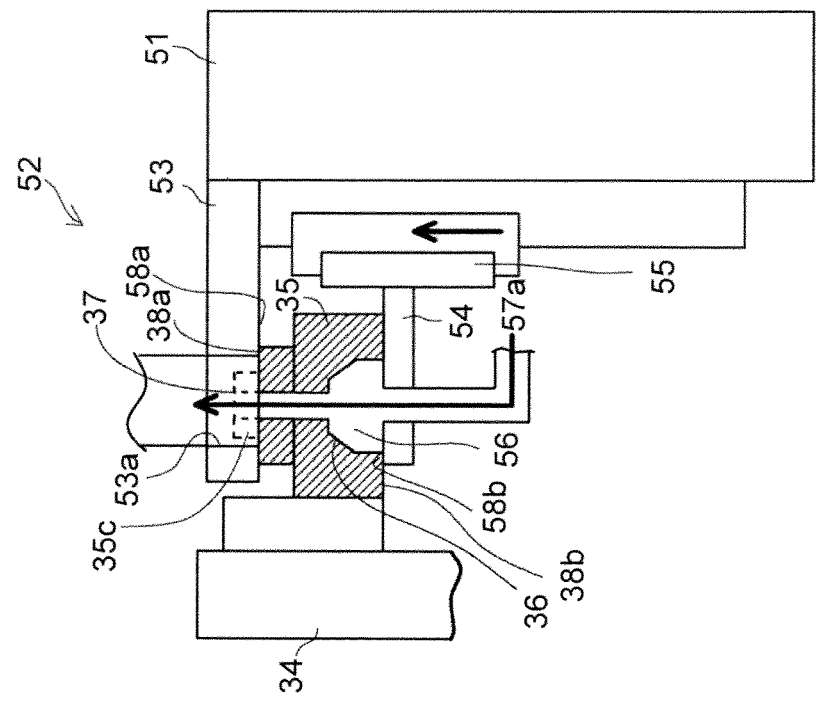
Figure 5B:
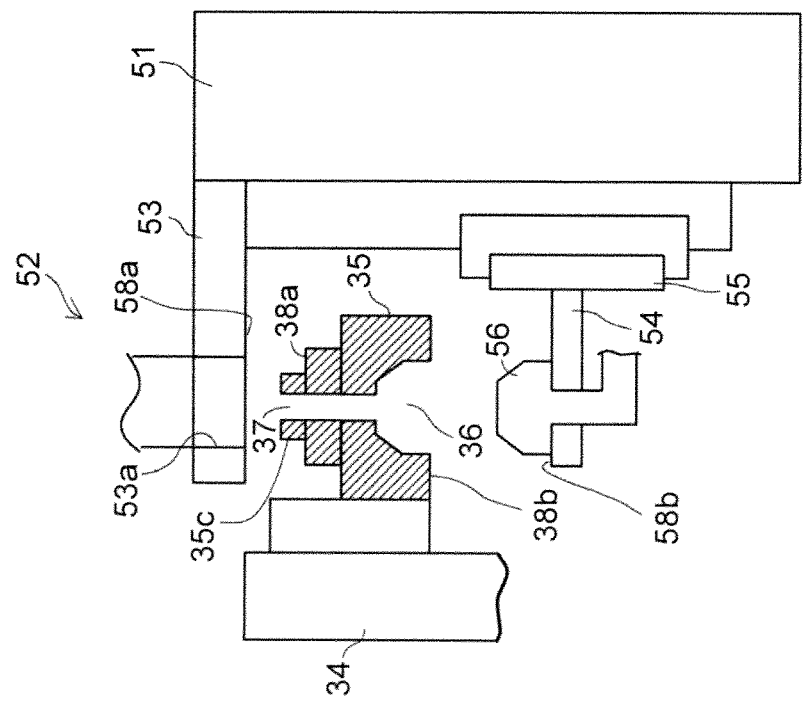

Next, the operation of the robot-clamped unit 35 and the tool unit 52 in the workpiece support system 1 will be described. FIGS. 5A and 5B are a view illustrating the robot-clamped unit and the tool unit in the workpiece support system according to Embodiment 1, of which FIG. 5A shows a state before the tool unit grasps the robot-clamped unit, and FIG. 5B shows a state where the tool unit has grasped the robot-clamped unit.

As shown in FIG. 5A, first, the leading end 51 of the robot 501 is moved to the vicinity of the robot-clamped unit 35. Before the tool unit 52 grasps the robot-clamped unit 35, the air supply hole 37 is under the atmospheric pressure. Accordingly, sliding of the Z-slide 33 is locked. Sliding of the X-slides 13 and the Y-slide 23 is locked by the lock 15 and the lock 25.

The lock 15 and the lock 25 may be interlocked with locking of the Z-slide 33 so that the lock 15 and the lock 25 are locked and unlocked by an operation of the robot-clamped unit 35, or the lock 15 and the lock 25 may separately have robot-clamped units. In the case where the lock 15 and the lock 25 separately have robot-clamped units, these robot-clamped units are the same in structure as the robot-clamped unit 35 except that the directions in which the X-slides 13 and the Y-slide 23 slide are different from the direction in which the Z-slide 33 slides.

The air cylinder 55 of the tool unit 52 is driven. Then, the lower finger 54 is moved so as to widen the clearance between the upper finger 53 and the lower finger 54. Thus, the length between the receiving surface 58a of the upper finger 53 and the receiving surface 58b of the lower finger 54 becomes larger than the length between the upper reference surface 38a and the lower reference surface 38b of the robot-clamped unit 35. Next, the robot 501 is moved closer to the support body 40 until the tool unit 52 can grasp the robot-clamped unit 35. Then, the receiving surface 58a of the upper finger 53 is opposed to the upper reference surface 38a of the robot-clamped unit 35. At the same time, the pin 56 formed on the receiving surface 58b of the lower finger 54 is opposed to the lower reference surface 38b of the robot-clamped unit 35.

Next, as shown in FIG. 5B, the air cylinder 55 of the tool unit 52 is driven. Then, the lower finger 54 is moved so as to narrow the clearance between the upper finger 53 and the lower finger 54. Thus, the receiving surface 58a of the upper finger 53 is brought in contact with the upper reference surface 38a, and the through-hole 53a of the upper finger 53 is fitted with the leading end portion 35c of the robot-clamped unit 35. At the same time, the receiving surface 58b of the lower finger 54 is brought in contact with the lower reference surface 38b of the robot-clamped unit 35, and the pin 56 is fitted into the pinhole 36.

In this way, the state where the tool unit 52 has grasped the robot-clamped unit 35 can be established. As the pin 56 is fitted into the pinhole 36, air 57a jetting out of the leading end of the pin 56 is supplied through the pinhole 36 into the air supply hole 37. Accordingly, the Z-slide 33 is unlocked. As a result, the Z-slide 33 becomes slidable. In the case where locking of the Z-slide 33 and locking of the Y-slide 23 and the X-slides 13 by the lock 25 and the lock 15, respectively, are interlocked with each other, the Y-slide 23 and the X-slides 13 are also unlocked and become slidable. Thus, the support 42 can be moved to an arbitrary position within a predetermined three-dimensional range (a range within which the slides are slidable in the X-, Y-, and Z-axis directions).

Thus, the support body 40 has the robot-clamped unit 35 that unlocks the support 42 by being supplied with the air 57a, and the robot 501 has the tool unit 52 that supplies the air 57a. As the tool unit 52 of the robot 501 grasps the robot-clamped unit 35 of the support body 40, the air 57a is supplied from the tool unit 52 to the robot-clamped unit 35 and the support 42 is unlocked.

With the tool unit 52 grasping the robot-clamped unit 35, the robot 501 moves the support 42 to an arbitrary three-dimensional position according to the shape of the workpiece. Thus, the robot 501 moves the support 42 in the workpiece support device 10.

After the support 42 is moved according to the shape of the workpiece, the air cylinder 55 of the tool unit 52 is driven to move the lower finger 54 away from the upper finger 53. Accordingly, the pin 56 of the lower finger 54 is disengaged from the pinhole 36. Then, the air supply hole 37 is placed under the atmospheric pressure, so that sliding of the Z-slide 33 is locked. Being interlocked with locking of the Z-slide 33, the lock 15 and the lock 25 also lock sliding of the X-slides 13 and the Y-slide 23. Accordingly, the position of the support 42 is also locked. In this way, the support 42 is locked at a position to which the support 42 has been moved according to the shape of the workpiece.

The tool unit 52 is separated from the robot-clamped unit 35, and the leading end of the robot 501 is moved closer to the support body 40 that is to be moved next. Then, the above-described operations are performed to unlock the support 42 and move the unlocked support 42 according to the shape of the workpiece. This process is repeated the number of times corresponding to the number of the supports 42.

Thus, by sequentially grasping a part, i.e., the robot-clamped unit 35, of each of the plurality of support bodies 40, the robot 501 unlocks the locked support 42 and moves the unlocked support 42 according to the shape of the workpiece.

For the plurality of support bodies 40, the supports 42 are unlocked and moved. Thus, the vehicle type switching step 71 is completed.

Instead of unlocking of the lock 15 and the lock 25 and unlocking of the Z-slide 33 being interlocked with each other, the lock 15 and the lock 25 may be separately unlocked. In other words, the support 42 may be unlocked and moved separately in the X-axis direction, the Y-axis direction, and the Z-axis direction. It is not absolutely necessary that the supports 42 of all the support bodies 40 are movable within a predetermined range, as long as the support 42 of at least one support body 40 is configured to be movable within the predetermined range.

Figure 6:
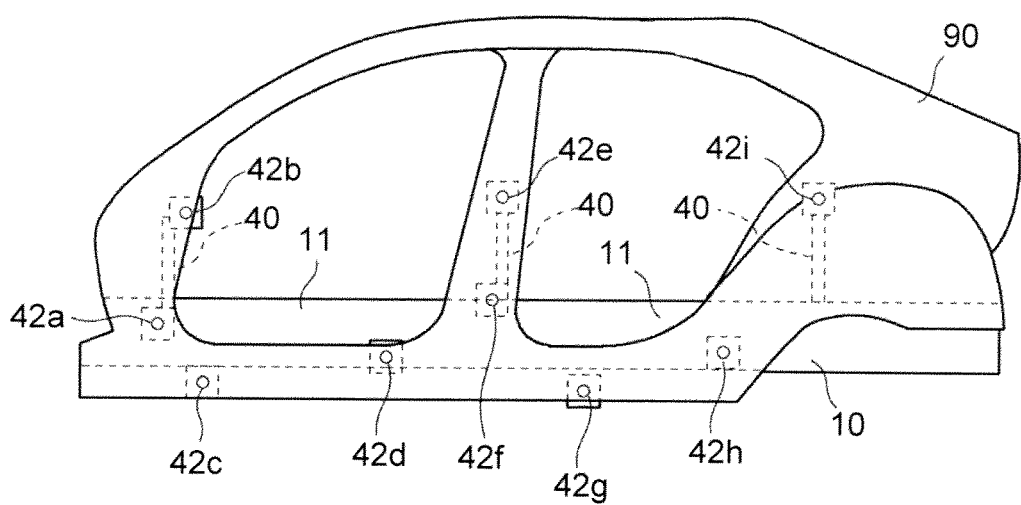
FIG. 6 is a top view illustrating a state where a workpiece is set on a workpiece support device in the workpiece support system according to Embodiment 1.

Next, the steps following the vehicle type switching step 71 will be described. FIG. 6 is a top view illustrating a state where the workpiece is set on the workpiece support device in the workpiece support system according to Embodiment 1.

As shown in FIG. 6, the positions of the supports 42 of the workpiece support device 10 are moved according to the shape of a workpiece 90, for example, a frame reinforcing part constituting a part of a side outer sub-assembly. Then, the workpiece 90 is set on the workpiece support device 10 in which the positions of the supports 42 have been moved. Thus, the workpiece support device 10 includes the plurality of support bodies 40 having the supports 42 that are movable and lockable at arbitrary positions and come in contact with the workpiece, and supports the workpiece 90 by the plurality of support bodies 40. The supports 42 of the support bodies 40 are inserted into predetermined places of the workpiece 90. For example, the positions of supports 42a, 42b, and so on to 42i in FIG. 6 correspond to the positions of the supports 42a, 42b, and so on to 42i in FIG. 2. The workpiece support device 10, on which the workpiece 90 has been set, moves along the line 70 while maintaining the joint positions of parts of the workpiece 90.

In the welding/deposition assembly step 73, the parts of the workpiece 90 are joined together by spot welding etc. Throughout the steps, the levelness of the workpiece support device 10 is secured. In the finished product removal step 74, the finished product is removed from the workpiece support device 10.

In a case where a new workpiece 90 of the same type is to be set on the workpiece support device 10 from which the workpiece 90 has been removed, the new workpiece 90 is set on the workpiece support device 10 with the supports 42 remaining unmoved. In a case where a new workpiece 90 of a different vehicle type is to be set on the workpiece support device 10, the supports 42 are moved according to the shape of the new workpiece 90 in the vehicle type switching step 71.

According to this embodiment, by grasping a part of the support body 40 of the workpiece support device 10, the robot 501, which is provided outside the workpiece support device 10, unlocks the support 42 and moves the unlocked support 42 according to the shape of the workpiece 90. Accordingly, it is not necessary to mount a driving source for the support 42 on the workpiece support device 10. As a result, the structure of the workpiece support device 10 can be simplified, and the transfer of the workpiece support device 10 between manufacturing steps, for example, can be facilitated.

The workpiece support device 10 of this embodiment is highly versatile; even those workpieces 90 that are manufactured in limited numbers can be handled simply by moving the supports 42. Thus, unlike in the related art, it is not necessary to produce specialized workpiece support devices 10 for workpieces 90 to be manufactured in limited numbers, so that the manufacturing cost can be reduced.

Moreover, the workpiece support device 10 of this embodiment does not have a driving unit, such as an actuator, for the supports 42. Therefore, a space for a spot welding gun to enter can be secured in the workpiece support device 10. Thus, the time and labor required for spot welding can be reduced. In addition, it is not necessary to secure a power source for the actuator.

The robot 501 can move the supports 42 with high accuracy. Even if the production of a vehicle type that has been manufactured in a limited number is expanded and the number of workpiece support devices 10 of which the supports 42 have been newly moved for that vehicle type is increased, errors among the workpiece support devices 10 can be reduced. Moreover, as the robot 501 works speedily, the operations can be performed within takt-time.

Locking and unlocking of the locks 15, 25 and the Z-slide 33 can be controlled through an air supply. The air 57a is supplied with the robot 501 grasping the support body 40. Accordingly, unless the robot 501 grasps the support body 40, the support 42 is not unlocked, so that displacement of the support 42 can be restrained. Moreover, the air 57a is supplied in the state where the pin 56 of the tool unit 52 is fitted into the pinhole 36 of the robot-clamped unit 35. Thus, the air supply is synchronized with the state where the robot 501 has securely grasped the support 42, so that a fall under the gravity etc. can be prevented.

The locks 15, 25 and the Z-slide 33 are normally locked under the atmospheric pressure. Therefore, displacement of the support 42 can be restrained even in the event of an emergency stop within a facility etc.

Embodiment 2

Figure 7:
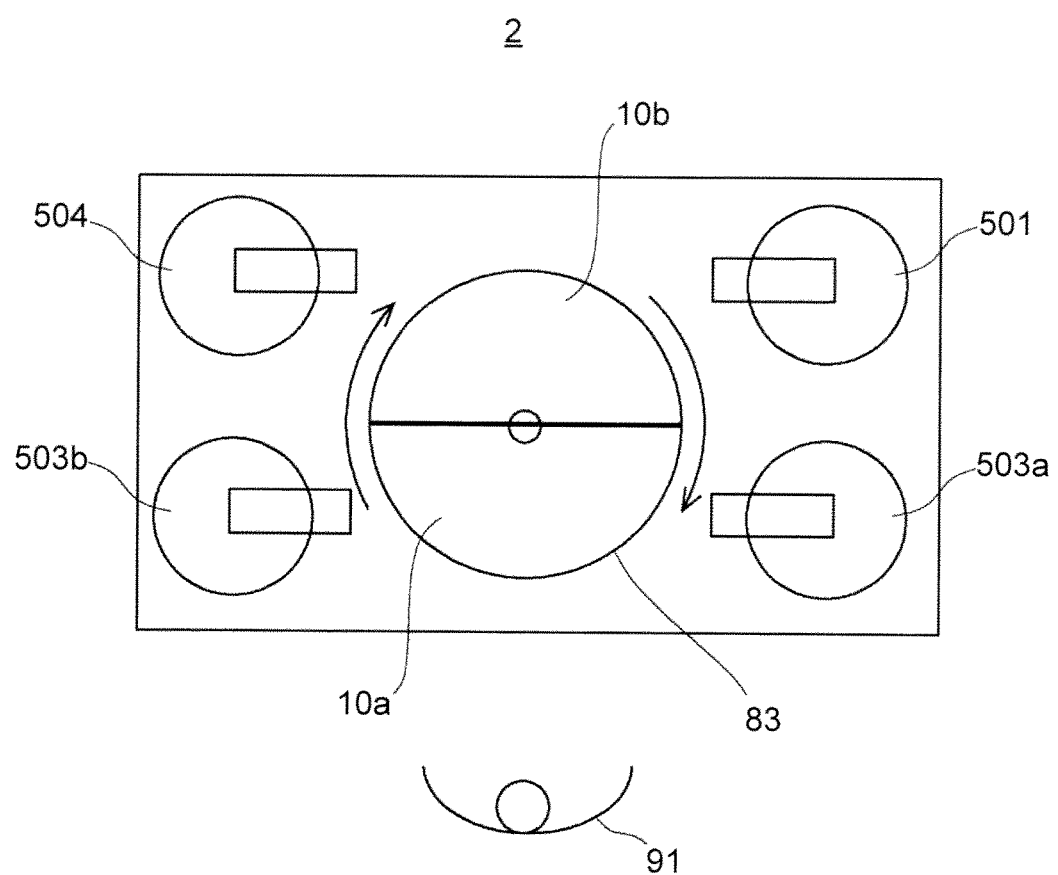
FIG. 7 is a top view illustrating a workpiece support system according to Embodiment 2.

Next, Embodiment 2 will be described. Embodiment 2 is the workpiece support device 10 mounted on a rotary table. FIG. 7 is a top view illustrating a workpiece support system according to Embodiment 2. As shown in FIG. 7, a workpiece support system 2 in Embodiment 2 is provided with a rotary table 83. The rotary table 83 has, for example, a disc shape. The upper surface of the rotary table is divided into two parts, with a workpiece support device 10a mounted on one part and a workpiece support device 10b mounted on the other part.

A plurality of, for example, four robots are provided around the rotary table 83. In the clockwise direction as seen from above, the robot 501 for the vehicle type switching step 71, a robot 503a for a first welding/deposition assembly step 73, a robot 503b for a second welding/deposition assembly step 73, and the robot 504 for the finished product removal step 74 are disposed in this order around the rotary table 83. Workpieces are set by a worker 91. Thus, with the workpiece support device 10a and the workpiece support device 10b mounted on the rotary table 83, the rotary table 83 is rotated and the predetermined steps are performed on the workpiece mounted on each workpiece support device 10.

According to the workpiece support system 2 of this embodiment, the vehicle welding assembly line 70 is not required, so that the production facility can be made compact and the production cost can be reduced.

Embodiment 3

Next, Embodiment 3 will be described. Embodiment 3 is about the support 42.

Figure 8:
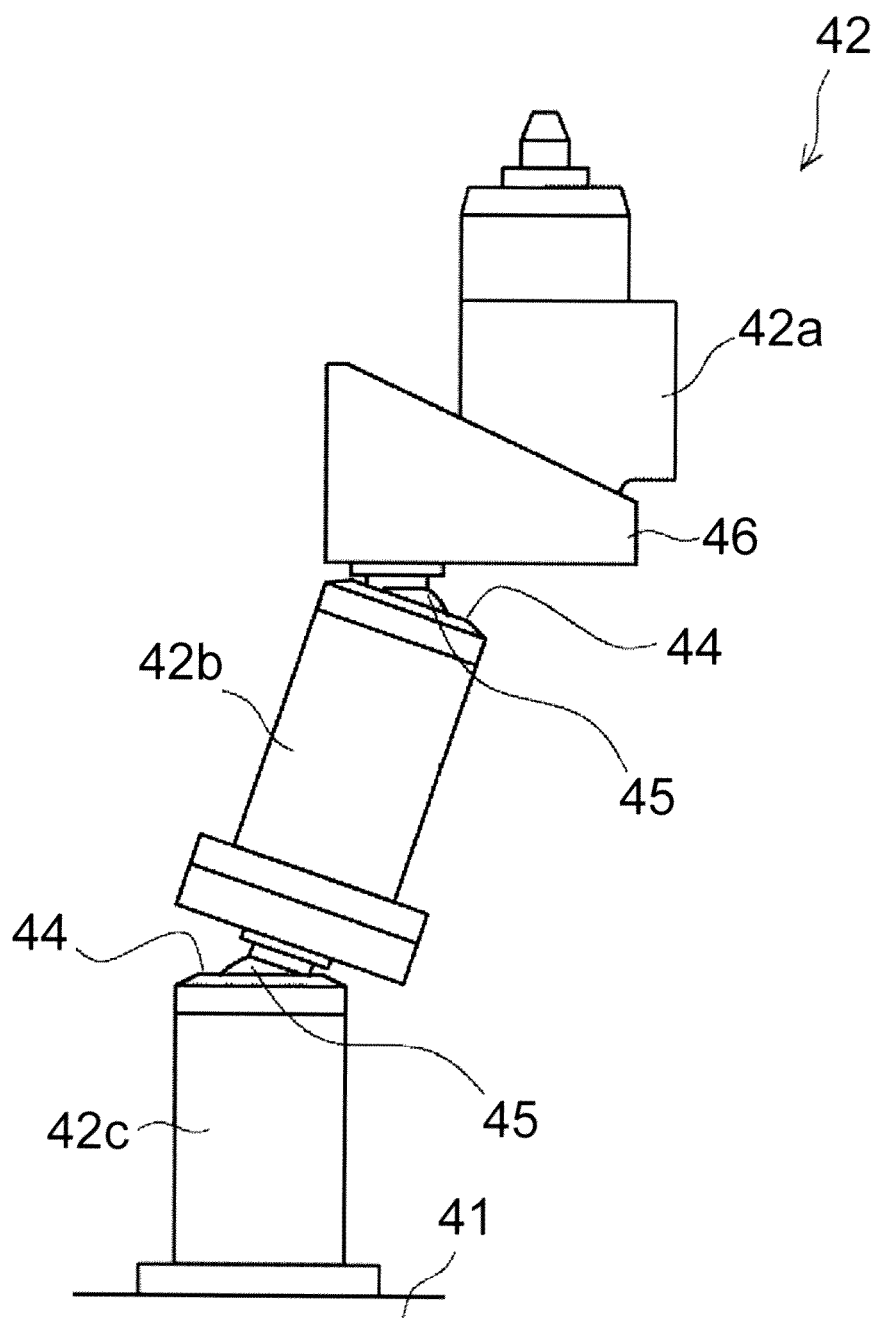
FIG. 8 is a view illustrating a support of a workpiece support device in a workpiece support system according to Embodiment 3.

FIG. 8 is a view illustrating a support of a workpiece support device in a workpiece support system according to Embodiment 3. As shown in FIG. 8, the support 42 of the support body 40 of the workpiece support device 10 is a combination of a support 42a, a support 42b, and a support 42c. Each support 42 has a circular columnar shape.

The support 42c is fixed to the pole 41 of the support body 40. A recess is formed in the upper surface of the support 42c. This recess serves as a spherical bearing 44. A spherical body 45 is attached to the bottom surface of the support 42b. The spherical body 45 of the support 42b is fitted in the spherical bearing 44 of the support 42c. Thus, the support 42b can be rotated relative to the support 42c at an arbitrary angle in a swiveling manner. The support 42b also has a recess formed at the leading end. The recess of the support 42b also serves as a spherical bearing 44.

The support 42a is fixed to the upper surface of a wedge-shaped body 46 of which the upper surface is inclined. A spherical body 45 is attached to the bottom surface of the wedge-shaped body 46. The spherical body 45 of the wedge-shaped body 46 is fitted in the spherical bearing 44 of the support 42b. Thus, the support 42a and the wedge-shaped body 46 can be rotated relative to the support 42b at an arbitrary angle in a swiveling manner.

In the vehicle welding assembly line 70, the supports 42 are inserted into predetermined portions of the workpiece 90 when the workpiece 90 is mounted on the support bodies 40 of the workpiece support device 10. Thus, the workpiece support device 10 supports the workpiece 90. Holes in the workpiece 90 into which the supports 42 are inserted have various shapes according to the vehicle type. The directions of the holes into which the supports 42 are inserted are not limited to the Z-axis direction.

According to the support 42 of this embodiment, the angle of the support 42 can be changed. Thus, the support 42 can be adapted to the holes having various shapes according to the vehicle type. The angle of the support 42 may be locked, for example, at the same time as the robot-clamped unit 35 locks sliding of the support 42. In this case, the angle of the support 42 is unlocked at the same time as the robot-clamped unit 35 unlocks sliding of the support 42.

Embodiment 4

Next, Embodiment 4 will be described. In this embodiment, the workpiece 90 is supported by rods of a uniform length that are movable in the upper-lower direction. FIGS. 9A and 9B are views illustrating a workpiece support device according to Embodiment 4.

As shown in FIG. 9A, the workpiece support device 10 is provided with the rods 47. The rod 47 has the shape of a rod extending in the upper-lower direction. A plurality of, for example, three rods 47 are provided. The rods 47 are of the same length. The rods 47 are disposed at intervals in the X-axis direction. The rods 47 are slidable in the upper-lower direction, i.e., in the Z-axis direction. The positions of the rods 47 are fixed by a lock mechanism similar to that of Embodiment 1.

For example, by grasping the robot-clamped unit 35, the robot 501 unlocks the rod 47. Then, the upper end of the rod 47 located at the center is moved upward. Thus, a workpiece 90 having a hat-like sectional shape with the central part located farther on the upper side than the peripheral part can be supported.

As shown in FIG. 9B, placing two workpiece support devices 10a, 10b with the same arrangement of the rods 47 on top of each other can create a clamping state where the workpiece 90 is held between the workpiece support devices. Thus, the workpieces 90 can be held in a stack without gap therebetween. Workpieces 90 of various shapes can be supported by changing the arrangement of the rods 47 in the X-, Y-, and Z-axis directions.

Embodiment 5

Figure 10:
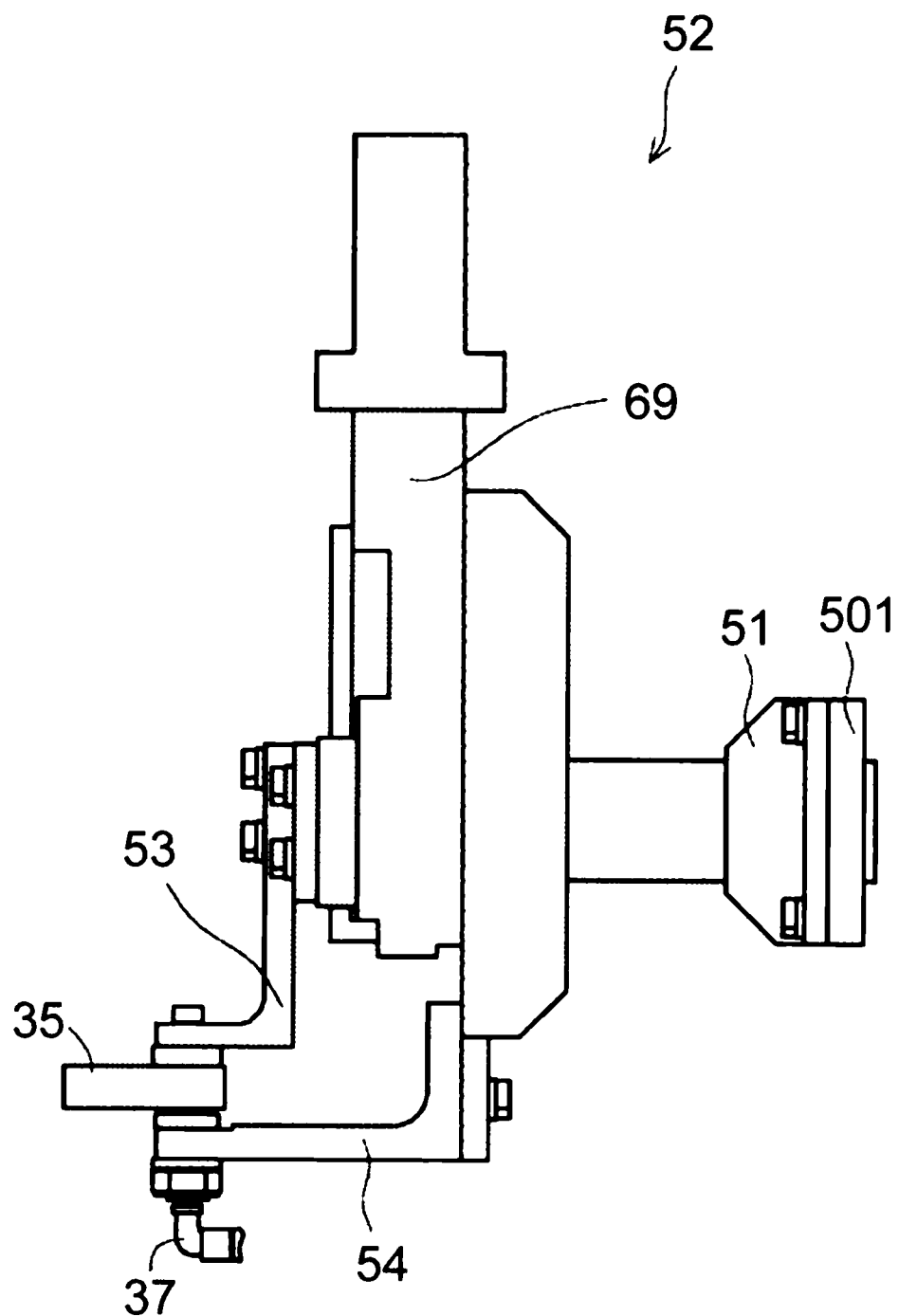
FIG. 10 is a view illustrating a tool unit in a workpiece support system according to Embodiment 5.

Next, Embodiment 5 will be described. In this embodiment, an actuator that drives the upper finger 53 is used instead of the air cylinder 55 that drives the lower finger 54. FIG. 10 is a view illustrating a tool unit in a workpiece support system according to Embodiment 5. As shown in FIG. 10, instead of the air cylinder 55 that drives the lower finger 54, an actuator 69 that drives the upper finger 53 is attached to the tool unit 52 of the robot 501. The actuator 69 is driven to move the upper finger 53 so as to widen or narrow the clearance between the upper finger 53 and the lower finger 54.

According to this embodiment, the actuator 69 can be used as an alternative to the air cylinder 55, and thus the options of the driving source for the tool unit 52 can be increased.

While the embodiments of the workpiece support system have been described, the disclosure is not limited to the above-described configurations and modifications can be made thereto within the scope of the technical idea.

For example, the workpiece support system 1 is applied to the vehicle welding assembly line 70 in the above embodiments, but the application is not limited thereto. The workpiece support system 1 may be applied to other lines where the workpiece support device 10 is used.

What is claimed is:

1. A workpiece support system comprising:
    a workpiece support device that supports a workpiece by a support body having a support that comes in contact with the workpiece; and
    a robot that is separately provided outside the workpiece support device and moves the support, wherein
    the support is configured to be movable within a predetermined range and lockable at an arbitrary position,
    by clamping a robot-clamped component of the support body, the robot unlocks the support and moves the unlocked support according to a shape of the workpiece,
    the support body includes an X-slide, a Y-slide, and a Z-slide, each of which is unlocked to move the support,
    the robot-clamped component unlocks the support by being supplied with air,
    the Z-slide is unlocked to become slidable by being supplied with the air, and the X-slide, Y-slide and Z-slide are interlocked so that when the Z-slide is unlocked, the X-slide and Y-slide are also unlocked to become slidable,
    the robot has a tool assembly that supplies the air, and
    as the tool assembly of the robot clamps the robot-clamped component of the support body, the air is supplied from the tool assembly to the robot-clamped component and the support is unlocked.

2. The workpiece support system according to claim 1, wherein the robot moves the support with the tool assembly thereof clamping the robot-clamped component.

3. The workpiece support system according to claim 1, wherein
    the robot-clamped component has a pinhole,
    the robot has a tool assembly that supplies the air,
    the tool assembly has a pin,
    as the tool assembly of the robot clamps the robot-clamped component of the support body, the air is supplied from the tool assembly to the robot-clamped component and the support is unlocked,
    when the pin of the tool assembly is fitted into the pinhole of the robot-clamped component, the air is supplied from the tool assembly to the robot-clamped component.

4. The workpiece support system according to claim 3, wherein
    the pinhole is connected to an air supply hole,
    the support body is locked when the air supply hole is an atmosphere, and
    the air is supplied to the air supply hole to unlock the support body.

5. The workpiece support system according to claim 1, wherein the support body further includes an X stage, a Y stage, and at least two Y-guides fixed on the X-stage.

6. The workpiece support system according to claim 5, wherein a lock is fixed on the X-stage between the at least two Y-guides.

7. The workpiece support system according to claim 6, wherein the Y-slide is slidable with respect to the lock in a Y-axis direction and is fixable to the lock.

8. The workpiece support system according to claim 7, wherein when the Y-slide is locked to be fixed to the lock, a position of the Y-stage is fixed.

9. The workpiece support system according to claim 8, wherein when the Y-slide is unlocked to be slidable with respect to the lock, the Y-stage is slidable in the Y-axis direction.

10. The workpiece support system according to claim 9,
    the robot-clamped component has a pinhole,
    the robot has a tool assembly that supplies the air,
    the tool assembly has a pin,
    as the tool assembly of the robot clamps the robot-clamped component of the support body, the air is supplied from the tool assembly to the robot-clamped component and the support is unlocked,
    when the pin of the tool assembly is fitted into the pinhole of the robot-clamped component, the air is supplied from the tool assembly to the robot-clamped component.

11. The workpiece support system according to claim 10, wherein the pinhole is connected to an air supply hole,
    the support body is locked when the air supply hole is an atmosphere, and
    the air is supplied to the air supply hole to unlock the support body.

12. The workpiece support system according to claim 7, wherein when the Y-slide is unlocked to be slidable with respect to the lock, the Y-stage is slidable in the Y-axis direction.

13. The workpiece support system according to claim 12, wherein
    the robot-clamped component has a pinhole,
    the robot has a tool assembly that supplies the air,
    the tool assembly has a pin,
    as the tool assembly of the robot clamps the robot-clamped component of the support body, the air is supplied from the tool assembly to the robot-clamped component and the support is unlocked,
    when the pin of the tool assembly is fitted into the pinhole of the robot-clamped component, the air is supplied from the tool assembly to the robot-clamped component.

14. The workpiece support system according to claim 13, wherein the pinhole is connected to an air supply hole,
    the support body is locked when the air supply hole is an atmosphere, and
    the air is supplied to the air supply hole to unlock the support body.

* * * * *